(12) United States Patent
Cabrera et al.

(10) Patent No.: US 9,308,992 B2
(45) Date of Patent: Apr. 12, 2016

(54) HELICOPTER BLADE RETENTION COMPOSITE YOKE

(75) Inventors: Pedro L. Cabrera, West Haven, CT (US); Kenneth F. Deyo, Thomaston, CT (US); David Templeton, Shelton, CT (US); Kevin Laitenberger, Beacon Falls, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 789 days.

(21) Appl. No.: 13/407,113

(22) Filed: Feb. 28, 2012

(65) Prior Publication Data

US 2013/0224022 A1  Aug. 29, 2013

(51) Int. Cl.
  *B64C 27/473* (2006.01)
  *B64C 27/48* (2006.01)

(52) U.S. Cl.
  CPC ........... *B64C 27/48* (2013.01); *Y10T 156/1052* (2015.01)

(58) Field of Classification Search
  CPC ........ B64C 11/04; B64C 27/39; B64C 27/41; B64C 27/43; B64C 27/48
  USPC ............................. 416/134 A, 210 R, 204 R
  See application file for complete search history.

(56) References Cited

U.S. PATENT DOCUMENTS

| | | | |
|---|---|---|---|
| 4,293,276 A | 10/1981 | Brogdon et al. | |
| 4,342,540 A | 8/1982 | Lovera et al. | |
| 4,369,019 A | 1/1983 | Lovera et al. | |
| 4,549,851 A | 10/1985 | Pariani | |
| 4,568,244 A * | 2/1986 | Wehnert et al. | 416/134 A |
| 4,568,245 A * | 2/1986 | Hibyan | B64C 27/32 413/134 A |
| 4,568,246 A | 2/1986 | Hibyan et al. | |
| 4,585,393 A * | 4/1986 | Hibyan et al. | 416/134 A |
| 5,074,494 A | 12/1991 | Doolin et al. | |
| 5,110,260 A | 5/1992 | Byrnes et al. | |
| 5,267,833 A | 12/1993 | Mouille | |
| 5,372,479 A * | 12/1994 | Byrnes et al. | 416/134 A |
| 5,431,538 A * | 7/1995 | Schmaling et al. | 416/134 A |
| 5,562,416 A * | 10/1996 | Schmaling et al. | 416/134 A |
| 5,605,440 A * | 2/1997 | Bocoviz et al. | 415/200 |
| 5,690,474 A * | 11/1997 | Byrnes et al. | 416/134 A |
| 5,738,494 A * | 4/1998 | Schmaling | 416/134 A |
| 7,845,909 B2 | 12/2010 | Stamps et al. | |

OTHER PUBLICATIONS

European Search Report for EP12199470.1, mailed Apr. 17, 2013, 7 pages.

* cited by examiner

*Primary Examiner* — Edward Look
*Assistant Examiner* — Jason Davis
(74) *Attorney, Agent, or Firm* — Cantor Colburn LLP

(57) ABSTRACT

A rotary wing aircraft yoke is provided including an arcuate medial portion. A pair of arms extends from the medial portion and each terminates in a distal end. The yoke is made from multiple plies of glass and graphite fibers of varying orientations. The number of graphite plies increases along each arm from adjacent the medial portion to the distal end.

15 Claims, 5 Drawing Sheets

HELICOPTER BLADE RETENTION COMPOSITE YOKE

BACKGROUND OF THE INVENTION

This invention was made with Government support under Agreement N00014-06-D-0045 D.O. 0013 for Composite Main Rotor Blade Attachment Yoke Manufacturing Technology Phase 1. The Government has certain rights in the invention.

BACKGROUND OF THE INVENTION

This invention relates to rotorcraft rotors and, more particularly, to a rotor blade mounting assembly.

A helicopter rotor hub is the primary structural assembly for driving torque to each rotor blade, balancing centrifugal loads between opposing rotor blades and transferring lift loads to the aircraft fuselage. Within the class of articulated rotors are those which include a rotor yoke, one per rotor blade, which is driven by a central hub plate via a multi-laminate elastomeric bearing. The dimensions of the rotor yoke are determined by the operational motion envelope of the rotor system and blade loads.

Historically, helicopter rotor hubs and their associated parts have been made of high strength, lightweight, critical metals or alloys. Although these metal components perform adequately, it is always desirable to reduce the empty weight of the helicopter. Presently, titanium and aluminum are used extensively because of their generally light weight and strength. There is a constant search for lighter and stronger materials. One consideration for decreasing the empty weight of the helicopter is to use fiber reinforced composites to replace metal components. However, the cost of a composite part, especially a part requiring a significant number of plies, is often not competitive with the comparable metal part that it is designed to replace.

BRIEF DESCRIPTION OF THE INVENTION

According to one embodiment of the invention, a rotary wing aircraft yoke is provided including an arcuate medial portion. The yoke also includes a pair of arms extending from the medial portion and terminating at a distal end. The yoke is made from multiple plies of glass and graphite fibers having varying orientations. The number of graphite plies increases along each arm from adjacent the medial portion to the distal end.

According to another embodiment of the invention, a rotor mount assembly for a rotary wing aircraft is provided including a hub plate having a plurality of spokes and arcuate segments. The rotor mount assembly also includes at least one rotor blade. At least one yoke connects the at least one rotor blade to the hub plate. The yoke includes an arcuate medial portion. A pair of arms extends from the medial portion and terminates in a distal end. The yoke is made from multiple plies of glass and graphite fibers of varying orientations. The number of graphite plies increases along each arm from adjacent the medial portion to the distal end. An elastomeric bearing is disposed between the medial portion of the yoke and an arcuate segment of the hub plate to accommodate the loading and displacement of the rotor blade. A cap fastened to the elastomeric bearing around the medial portion of the yoke holds the elastomeric bearing to the yoke.

According to yet another embodiment of the invention, a method of manufacturing a yoke for a rotary wing aircraft is provided including attaching a preform to a tool head. The preform is contoured to form at least two yokes facing each other. A plurality of glass fibers of varying orientations are then wound around the preform. A plurality of plies of graphite fibers of varying orientations are placed around at least a portion of the preform. The preform is then cured and multiple yokes are machined from the fibers around the preform.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
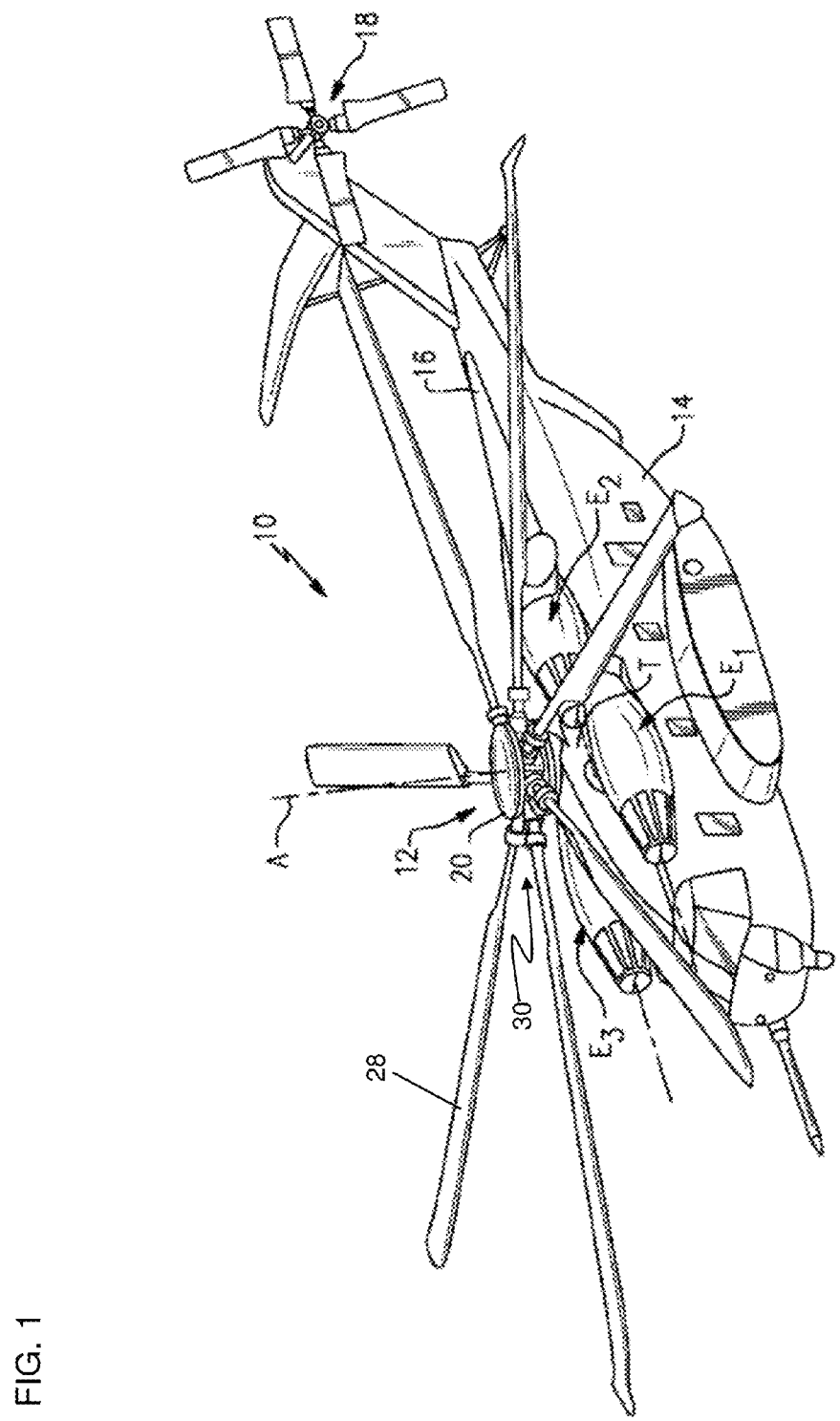
FIG. 1 is a perspective view of a rotary wing aircraft for use with the present invention.

FIG. 1 schematically illustrates a rotary-wing aircraft 10 having a main rotor system 12. The aircraft 10 includes an airframe 14 having an extending tail 16 which mounts a tail rotor system 18 as an anti-torque system. The main rotor assembly 12 is driven about an axis of rotation A through a main gearbox (illustrated schematically at T) by one or more engines E. The main rotor system 12 includes multiple rotor mount assemblies 30 each for connecting a blade 28 to a rotor hub 20. Although a particular helicopter configuration is illustrated and described in the disclosed non-limiting embodiment, other configurations and/or machines, such as high speed compound rotary wing aircraft with supplemental translational thrust systems, dual contra-rotating coaxial rotor system aircraft, turboprops, tilt-rotors, and tilt-wing aircraft, will also benefit from the present invention.

Figure 2:
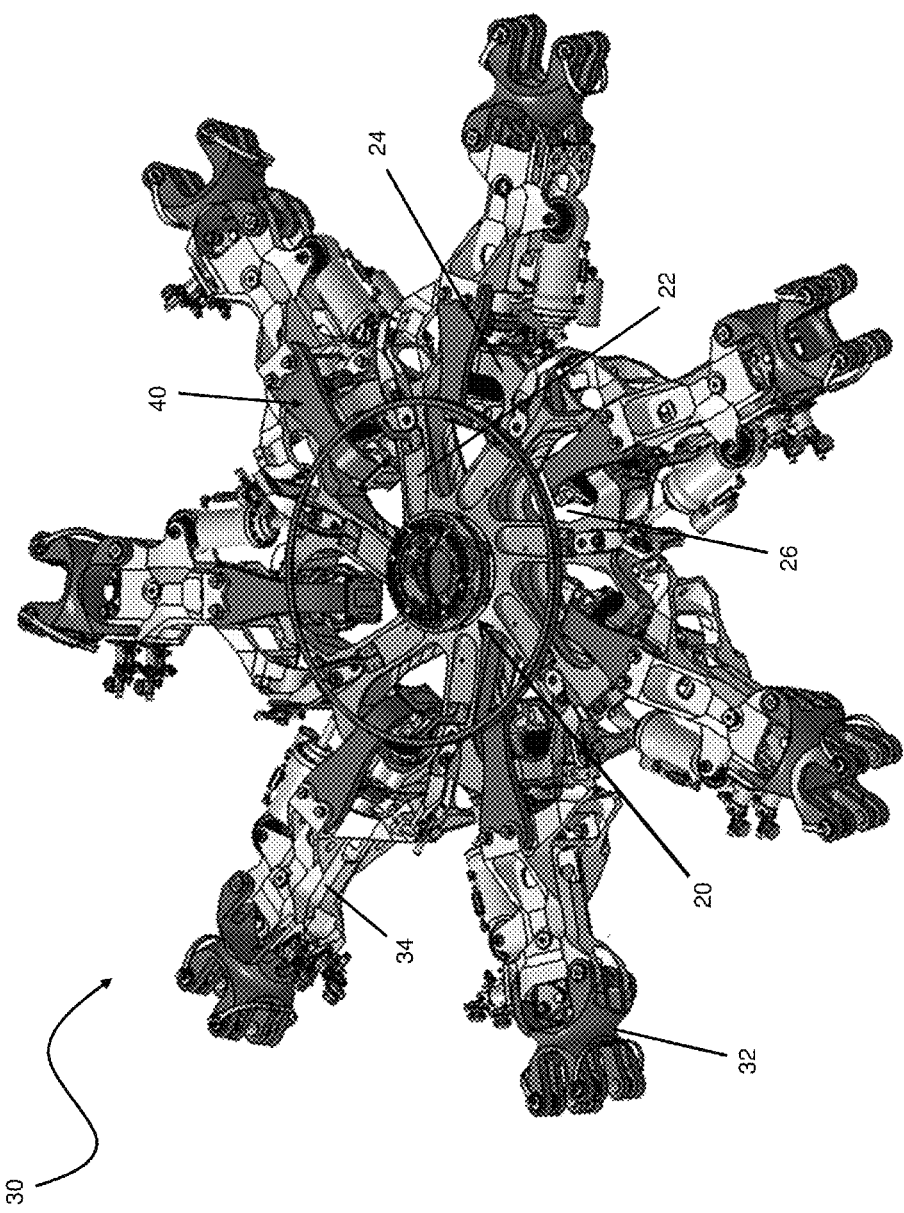
FIG. 2 is a detailed perspective view of a rotor mount assembly.

FIG. 2 depicts a perspective view of a rotor mount assembly 30 for driving a plurality of rotor blades 28 about an axis of rotation A. The rotor mount assembly 30 includes a hub plate 20 which is adapted for mounting to a rotor shaft (not shown) and which includes a plurality of radial spokes 22 and arcuate segments 24 for structurally interconnecting adjacent spokes 22. The radial spokes 22 and arcuate segments 24 define hub plate apertures 26 for accepting rotor yoke assemblies 40. Each yoke assembly is structurally interconnected to a rotor blade 28 by a mounting sleeve 34 joined to a blade attachment 32.

Figure 3:
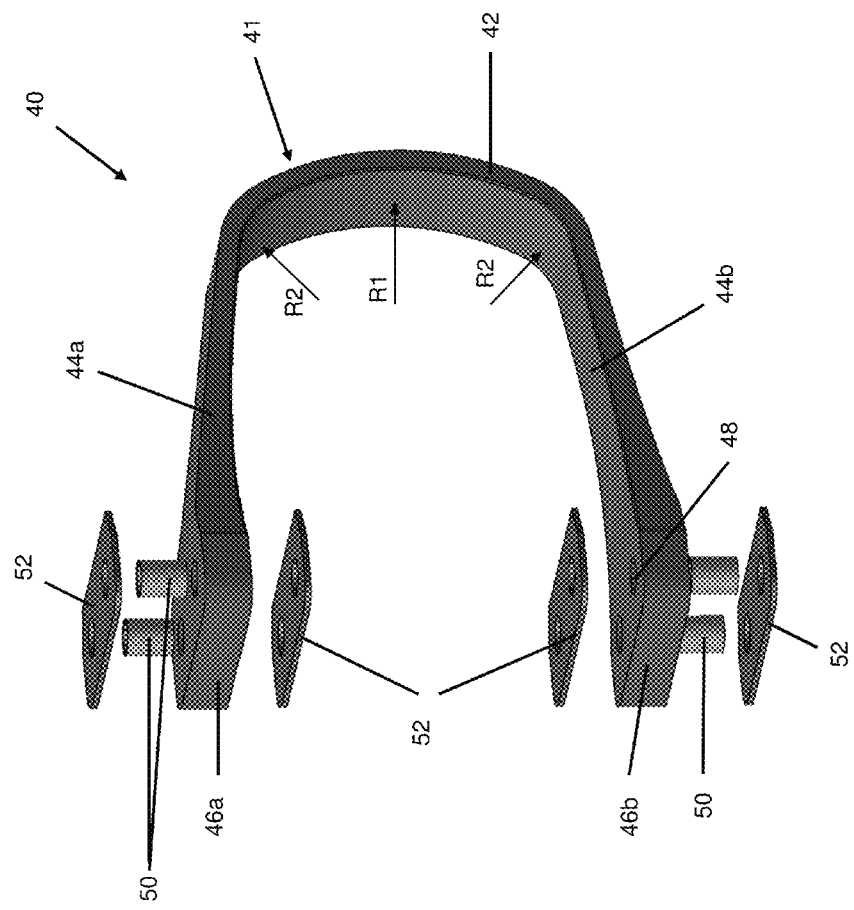
FIG. 3 is a perspective view of a yoke assembly.
Figure 4:
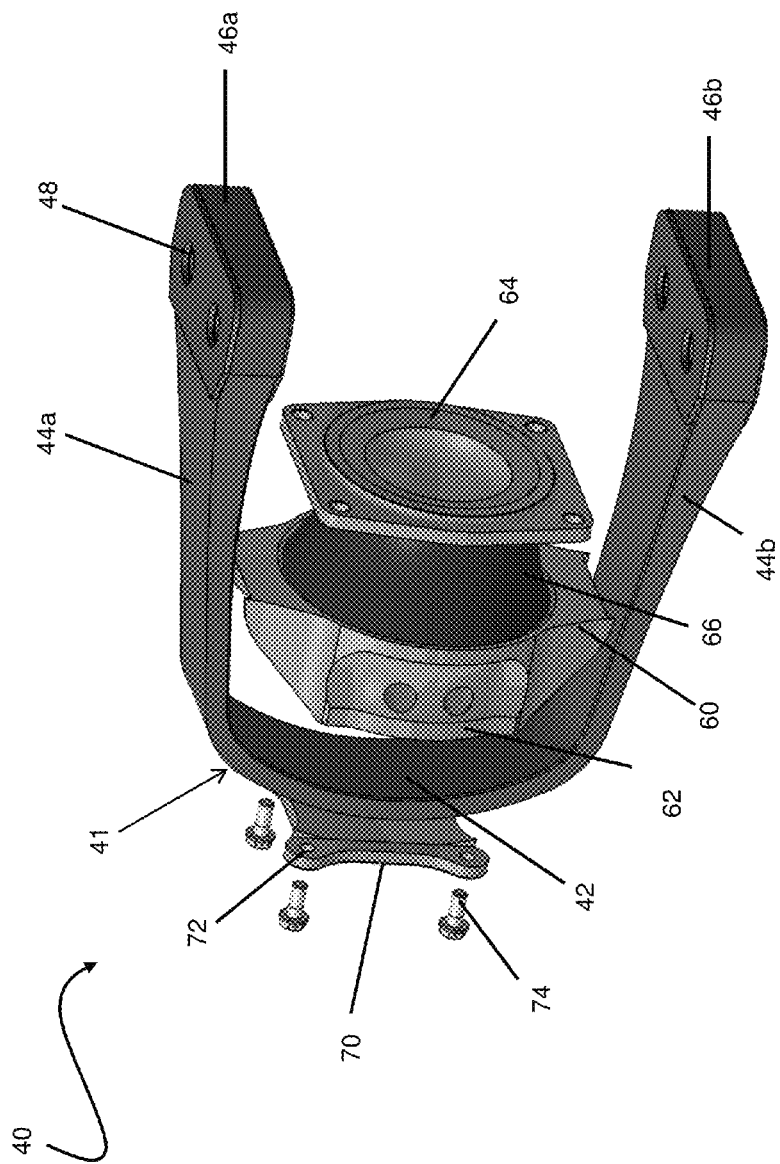
FIG. 4 is a perspective view of a yoke assembly including an elastomeric bearing.

Referring now to FIGS. 3 & 4, the rotor yoke assembly 40 has a generally U-shaped yoke 41 and includes a curved medial portion 42 which extends through the respective hub plate aperture 26. In a preferred embodiment, the curve of the medial portion 42 has a radius R1. Upper arm 44a and lower arm 44b project radially outboard from the ends of medial portion 42, such that the yoke 41 therefore loops about the respective arcuate segment 24 so that the upper and lower arms 44a, 44b are disposed above and below the arcuate segment 24 and extend radially outboard thereof. A bend that is more acute than the curvature of the medial portion, joins each arm 44a, 44b to the medial portion 42. In a preferred embodiment, the bend is a radius R2 that is smaller than radius R1 of the medial portion 42. Each arm 44a, 44b of yoke 41 includes a distal end 46a and 46b respectively. At least one mounting aperture 48 is formed through the distal ends 46a, 46b of the upper and lower arms 44a, 44b for connecting the yoke 41 with the mounting sleeve 34 to transfer the operational loads of the rotor system. A bushing 50 is located within each mounting aperture 48, and a pad 52 is disposed adjacent the top and bottom surfaces of the distal ends 46a, 46b between the yoke 41 and mounting sleeve 34 to prevent damage at the connection with mounting sleeve 34.

An elastomeric bearing 60 is interposed between the arcuate segment 24 of the rotor hub 20 and the medial portion 42 of the rotor yoke assembly 40 to accommodate the load and multidirectional displacement of the rotor blade. Outer member 64 of the elastomeric bearing 60 contacts the arcuate segment 24 of hub 20 and inner member 62 of the elastomeric bearing 60 contacts the medial portion 42 of the yoke 41. A cap 70 holds the inner member 62 in place against the medial portion 42 of the yoke 41. The cap 70 includes a channel portion that contacts the medial portion 42 of the yoke 41. This channel portion has a complementary curvature to enhance the surface contact between the cap 70 and the yoke 41 and to limit relative movement. The cap 70 is wider than the medial portion 42 of the yoke 41 such that the holes 72 extending through the cap 70 are located near the edges of the medial portion 42. Bolts 74 extend from the cap 70, around medial portion 42, to engage the inner member 62 thereby compressing the medial portion 42 of yoke 41 between the cap 70 and the inner member 62 of the elastomeric bearing 60.

In one embodiment, the yoke 41 is made from a plurality of materials. The materials are selected so that the yoke 41 has generally similar strength, flexibility and dimensions as a metal yoke intended for use in the same application. The medial portion 42 of yoke 41 must be able to bend and may be made from multiple layers or plies of glass fiber. Any suitable glass fiber, such as S-2 Glass® for example, may be used. The fibers within any one glass ply are continuous and unidirectionally oriented, but the plies are stacked one atop the other at various angles, such as in a ±4° orientation for example. Because the yoke 41 connects to the mounting sleeve 34 at distal ends 46a and 46b, these ends 46a, 46b require additional tensile and shear strength and may consist of a combination of materials. In addition to the glass plies, the distal ends 46a, 46b may include multiaxially oriented multiple plies of unidirectionally oriented graphite fibers. For example, the distal ends 46a, 46b may include a plurality of graphite plies stacked at a ±45° orientation and a 90° orientation. In one embodiment, the distal ends 46a, 46b are made up of generally 49% glass fibers stacked at a ±4° orientation, 41% graphite fibers stacked at a ±45° orientation, and 10% graphite fibers stacked at a 90° orientation. However, the yoke 41 may include any of a number of variations of the percentages of glass and graphite fibers, as well as orientation angles of the fibers in each ply. The plies of the distal ends 46a, 46b are layered such that no two consecutive plies are identical in material and orientation. Additionally, the material and the orientation of the fibers of the plies may generally alternate.

The arms 44a, 44b connecting the medial portion 42 and the distal ends 46a, 46b has a combination of the materials included in the distal ends 46a, 46b. Arms 44a, 44b increase in thickness as they extend from the medial portion 42 toward the distal ends 46a, 46b. The graphite composition in each of the arms increases as the thickness increases. This is accomplished by, for example, increasing the number of graphite plies progressively along the arms 44a, 44b from a section adjacent medial portion 42 to a section of the arms 44a, 44b adjacent the distal ends 46a, 46b. In a preferred embodiment, the sections of the arms 44a, 44b immediately adjacent the medial portion 42 and distal ends 46a, 46b, each includes a number of graphite plies substantially equal to the number of graphite plies in the medial portion 42 and distal ends 46a, 46b, respectively.

Figure 5:
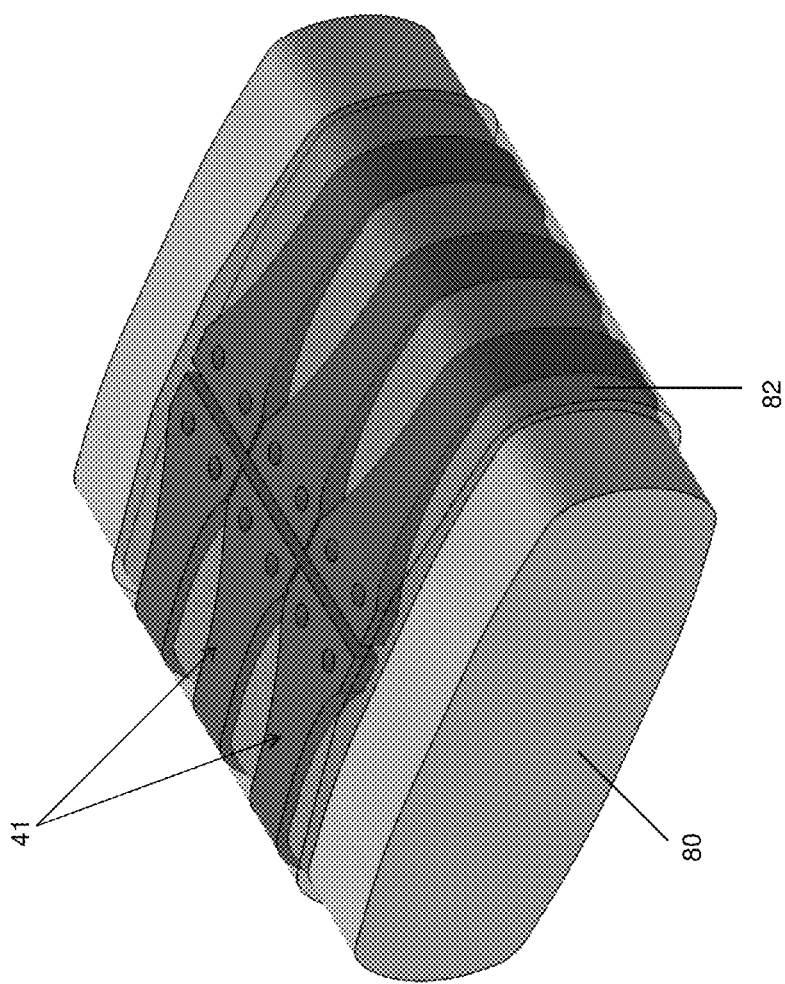
FIG. 5 is a perspective view of a manufacturing tool for making a plurality of yokes.

Referring now to FIG. 5, one method of manufacturing a yoke 41 includes placing multiple layers of fibers onto a tool head 80 to form a preform 82. The side surfaces of the tool head 80 have a radius R1 and the side surfaces converge with the top and bottom surfaces of the tool head 80 at a bend area having a radius R2. The tool head 80 is shaped to match the contour of the yoke such that two yokes may be formed having their distal ends 46a, 46b adjacent one another in the center of the top and bottom surface. The tool head 80 may have an extended length for manufacturing a plurality of yokes 41 during a single manufacturing operation, thereby reducing manufacturing costs.

Plies of fibers are placed individually around at least a portion of the surface of the tool head 80 to form the preform 82. Numerous sequences for the order in which the plies may be placed exist. In one embodiment, no two consecutive layers are identical in material and fiber orientation. Additionally, the material of each layer can, but need not alternate, such as positioning a graphite layer between glass layers for example. For example, a first glass ply may be placed around the entire tool head 80, having a 0° or a ±4° orientation. The next ply may be a first graphite ply having fibers at either a ±45° or a 90° orientation. This first graphite layer will be laid on only a portion of the two longer surfaces of the tool head 80 which form the arms 44a, 44b and distal ends 46a, 46b of a plurality of yokes 41. A second glass layer, having a different fiber orientation than the prior glass ply, may then be wound around the entire tool head 80. A second graphite ply may then be laid on top of the second glass ply. The second graphite ply may have a different fiber orientation than the first graphite layer. Consecutive graphite plies become increasingly shorter to create the tapered thickness of arms 44a, 44b. Once all of the fiber layers have been placed, the tool head 80 is then cured at an optimal temperature and time based on the composition of the materials to form a preform 82. Individual yokes 41 and their corresponding mounting apertures 48 are then machined from the cured composite preform 82.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotary wing aircraft yoke comprising:
   an arcuate medial portion; and
   a pair of arms, each extending from the medial portion and terminating in a distal end, the distal ends being substantially aligned such that an adjacent component is received within an opening formed between the distal ends of the pair of arms, each arm being made from plies of glass fibers and graphite fibers having varying configurations such that no two consecutive plies are identical in material and orientation, wherein at least a portion of the glass plies in the yoke have a ±4° fiber orientation;

wherein a number of graphite plies increases along each arm from adjacent the medial portion to the distal end and wherein the distal end of each arm is formed from a plurality of graphite plies and a plurality of glass plies arranged in an alternating configuration.

2. The rotary wing aircraft yoke according to claim 1, wherein the pair of arms has a variable thickness.

3. The rotary wing aircraft yoke according to claim 1, wherein the graphite plies have a ±45° or a 90° fiber orientation.

4. The rotary wing aircraft yoke according to claim 1, wherein glass plies having a fiber orientation of ±4° make up approximately 49% of the distal end, graphite plies having a fiber orientation of ±45° make up approximately 41% of the distal end, and graphite plies having a fiber orientation of 90° make up approximately 10% of the distal end.

5. The rotary wing aircraft yoke according to claim 1, wherein each arm connects to the medial portion by a bend, such that the medial portion has a first radius, and the bend connecting the arm to the medial portion has a second radius that is smaller than the first radius.

6. A rotary wing aircraft rotor mount assembly comprising:
a hub plate having a plurality of spokes and arcuate segments;
at least one rotor blade;
at least one yoke for connecting the blade to the hub plate including:
an arcuate medial portion;
a pair of arms, each extending from the medial portion and terminating in a distal end, the distal ends being substantially horizontally aligned such that an adjacent component is received within an opening formed between the distal ends of the pair of arms, each arm being made from plies of glass fibers and graphite fibers having varying configurations such that no two consecutive plies are identical in material and orientation, wherein at least a portion of the glass plies in the yoke have a ±4° fiber orientation;
wherein a number of graphite plies increases along each arm from adjacent the medial portion to the distal end and wherein the distal end of each arm is formed from a plurality of graphite plies and a plurality of glass plies arranged in an alternating configuration; and
an elastomeric bearing disposed between the medial portion of the yoke and an arcuate segment of the hub plate to accommodate the loading and displacement of the rotor blade, wherein a cap fastened to the elastomeric bearing adjacent the edges of the medial portion of the yoke holds the elastomeric bearing to the yoke.

7. The rotary wing aircraft rotor mount assembly according to claim 6, wherein the elastomeric bearing includes an inner member in contact with the medial portion of the yoke and an outer member in contact with the arcuate segment of the hub plate.

8. The rotary wing aircraft rotor mount assembly according to claim 6, further comprising:
a blade attachment connected to an end of the rotor blade; and
a mounting sleeve connected at a first end to the blade attachment and at a second end to the distal end of the yoke.

9. The rotary wing aircraft rotor mount assembly according to claim 8, wherein a nylon pad is disposed adjacent a top surface and a bottom surface of the distal end of the yoke between the yoke and the mounting sleeve.

10. A method of manufacturing a rotary wing aircraft yoke comprising:
placing a plurality of plies of glass fibers of varying orientations around a tool head contoured to form at least two yokes facing each other, each yoke including a pair of arms, a distal end of each arm being substantially aligned such that an adjacent component is receivable within an opening formed between the distal ends, wherein at least a portion of the plurality of glass plies having a ±4° fiber orientation;
placing a plurality of plies of graphite fibers of varying orientations around at least a portion of the tool head to form a preform, the plurality of glass plies and the plurality of graphite plies having varying configurations such that no two consecutive plies are identical in material and orientation; and
curing the preform; and
machining a plurality of yokes from the preform.

11. The method of manufacturing a rotary wing aircraft yoke according to claim 10, wherein the length of the tool head determines how many yokes will be manufactured.

12. The method of manufacturing a rotary wing aircraft yoke according to claim 10, wherein consecutive graphite plies become increasingly shorter to create a tapered arm of the yoke.

13. The method of manufacturing a rotary wing aircraft yoke according to claim 10, wherein the orientation or material of adjacent plies is not identical.

14. The method of manufacturing a rotary wing aircraft yoke according to claim 10, wherein the graphite plies have a ±45° or a 90° fiber orientation.

15. The method of manufacturing a rotary wing aircraft yoke according to claim 10, wherein glass plies having a fiber orientation of ±4° make up approximately 49% of the distal end, graphite plies having a fiber orientation of ±45° make up approximately 41% of the distal end, and graphite plies having a fiber orientation of 90° make up approximately 10% of the distal end.

* * * * *